United States Patent [19]
Diesinger et al.

[11] 4,075,832
[45] Feb. 28, 1978

[54] PARTITION FOR ROCKET MOTORS
[75] Inventors: Walter Helmut Diesinger, Bergisch Gladbach; Klaus Peter Kosiolek, Konigswinter, both of Germany
[73] Assignee: Dynamit Nobel Aktiengesellschaft, Germany
[21] Appl. No.: 637,958
[22] Filed: Dec. 5, 1975
[30] Foreign Application Priority Data
  Dec. 9, 1974  Germany ............... 2458180
[51] Int. Cl.² .............. F02K 9/04; F16K 15/03
[52] U.S. Cl. ........................ 60/245; 60/250; 60/254; 137/70; 137/521; 137/527
[58] Field of Search ........... 60/245, 250, 254; 137/70, 527, 512, 520, 521, 68 R, 71
[56] References Cited
U.S. PATENT DOCUMENTS

| 2,358,101 | 9/1944 | Randall | 137/70 |
| 2,553,267 | 5/1951 | Nedoh | 137/68 R |
| 2,831,499 | 4/1958 | Myron | 137/527 |
| 2,905,358 | 9/1959 | Herbage | 137/70 |
| 2,923,317 | 2/1960 | McInerney | 137/521 |
| 3,039,482 | 6/1962 | Goldberg | 137/68 R |
| 3,127,148 | 3/1964 | Collar | 137/527 |
| 3,191,619 | 6/1965 | Allen | 137/527 |
| 3,640,306 | 2/1972 | Vogt | 137/527 |
| 3,831,628 | 8/1974 | Kintner et al. | 137/527 |
| 3,879,942 | 4/1975 | Dorn et al. | 60/250 |
| 3,888,079 | 6/1975 | Diesinger | 60/245 |

FOREIGN PATENT DOCUMENTS
  674,719  11/1963  Canada ............... 137/70

Primary Examiner—Robert E. Garrett
Attorney, Agent, or Firm—Craig & Antonelli

[57] ABSTRACT

A partition arrangement for rocket motors with at least two mutually independent thrust stages and nozzle and nose sides. The partition arrangement includes a partition member separating a combustion chamber on the nozzle side from another chamber on the nose side with the partition member being provided with at least one flow aperture therein. A sealing element is disposed on the nozzle side for sealing the at least one flow aperture of the partition member with the sealing element being displaceable for freeing the at least one flow aperture of the partition member and being maintained within the another chamber on the nozzle side upon displacement. At least the partition member and/or the sealing element is provided with only one flow aperture for permitting propellant gases from the nose side combustion chamber to enter the another chamber on the nozzle side only in a central direction.

19 Claims, 7 Drawing Figures

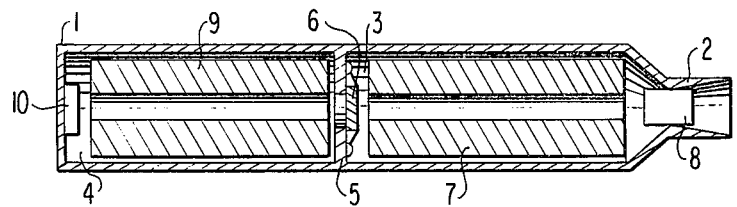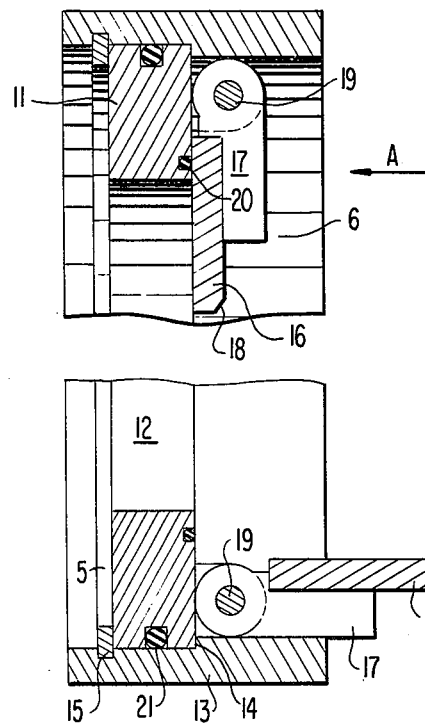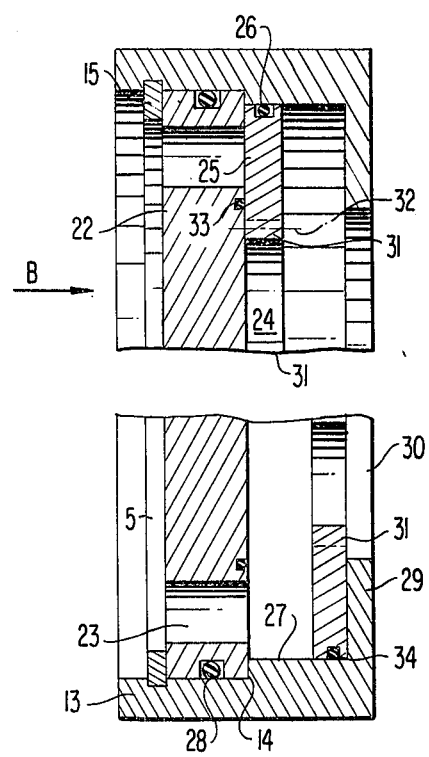

PARTITION FOR ROCKET MOTORS

The present invention relates to a partition for rocket motors with at least two mutually independent thrust stages wherein the partition separates a combustion chamber with a solid propellant charge from a further chamber on the nose side, the partition having at least one flow aperture therethrough and a displaceable sealing element sealing the aperture.

A partition having several flow apertures and plugs sealing the apertures is known for rocket motors with at least two mutually independent thrust stages from DOS [German Unexamined Laid-Open Application] No. 2,214,802, which serves for separating a combustion chamber provided with a solid propellant and at least one nozzle from an additional chamber arranged on the opposite side from the nozzle or at the nose end, especially a further combustion chamber with a solid propellant charge. It is also possible, for example, to accommodate in the additional chamber a ramjet engine with air inlet and fuel injection. After the propellant charge in the combustion chamber on the nozzle side has been combusted, the further propellant charge accommodated, for example, in the combustion chamber on the nose side is ignited and during this step the plugs are pressed into the combustion chamber on the nozzle side and ejected through the at least one nozzle. However, there is the danger in this procedure that the plugs jam in the nozzle and impair the unimpeded exiting of the propellant gases, which can result, for instance, in an explosion of the solid rocket motor. A further disadvantage is the danger of damage to the nozzle inlet and/or the narrowest cross section of the nozzle by the plugs, since the latter are expelled through the nozzle at great speed.

Furthermore, partitions having at least two flow apertures are known from DOS No. 2,230,457 wherein the plugs are mounted to be axially displaceable at a holding means and, after they have been pushed out of the flow aperture, the plugs are mounted to be laterally displaceable or pivotable. Disadvantages of this solution are the comparatively locally high thermal load on the combustion chamber wall on the nozzle side due to the asymmetrical entrance of the propellant gases into the nozzle-side combustion chamber, as well as the relatively small cross section of the apertures in the partition. Due to a small opening cross section, the propellant gases are subjected to strong turbulence. In addition to resulting in an increase in heat transfer to the combustion chamber wall on the nozzle side, this leads to a reduction in the impulse specific to the mechanism.

It is therefore an object of the present invention to provide a partition for rocket motors with at least two mutually independent thrust stages which avoids the above-mentioned disadvantages.

It is another object of the present invention to fashion the partition so that unfavorable mechanical and/or thermal stresses on the motor and undesired reductions in the impulse specific to the device are excluded to a maximum extent.

In accordance with the present invention, there is provided a partition for rocket motors with at least two mutually independent thrust stages for separating a combustion chamber with a solid propellant charge on the nozzle side from a further combustion chamber on the nose side and wherein the partition or the sealing element has only a single flow aperture arranged at least substantially coaxially. This preferably circular, single flow aperture of the partition or of the sealing element, which aperture can correspondingly be fashioned to be large, determines the entrance of the propellant gases into the combustion chamber on the nozzle side and advantageously ensures that the propellant gases flow into the combustion chamber on the nozzle side centrally and axially over a relatively large cross section. This single flow aperture for the nozzle-side combustion chamber effects a concentration and/or focusing and thus a relatively undisturbed entrance of the propellant gases. Accordingly, locally excessive thermal stresses are avoided and turbulences in the gaseous stream, resulting in energy losses, are reduced to a maximum degree. Since the sealing element, after the flow aperture has been uncovered, is not ejected from the motor, but rather is held within the nozzle-side combustion chamber, any mechanical damage to the motor is likewise excluded.

The designations "nozzle-side" or "nose-side" are not limited, in this connection, to the chambers and/or propellant charges immediately adjoining the nozzle or nose of the motor, but rather refer in case of a motor with three, four, or more propellant charges to be ignited in sequence also to the interposed propellant charges and/or combustion chambers.

In accordance with an embodiment of the present invention, the partition is constructed preferably in the form of a circular annular disk with a single, central flow aperture sealed on its nozzle side by means of the bursting diaphragm as a sealing element having the shape of a circular disk. The bursting diaphragm is provided with a predetermined breaking line, preferably a linear notch subdividing the diaphragm into two halves, so that the reproducible disintegration of the bursting diaphragm is ensured. Once the gas pressure in the nose-side chamber, e.g. after the ignition of a solid propellant charge arranged at that location, has reached the predetermined bursting pressure, the bursting diaphragm is ruptured, thus freeing the single, central large flow aperture of the partition. The two halves of the burst-open diaphragm are joined, for example by way of respectively one rotatably held mounting, with the housing of the nozzle-side combustion chamber and are swung outwardly under the effect of the propellant gases flowing into this combustion chamber, preferably into a position completely uncovering the single flow aperture. Depending on the requirements, it is, of course, also possible to subdivide the bursting diaphragm by means of predetermined breaking lines so that, during its rupturing, three or more fragments are produced, each fragment being held separately by means of corresponding fastening mechanisms. In this connection, it is also advantageous for the fragments of the bursting diaphragm to execute during the pivoting step only a movement in the axial and radial directions, rather than in the peripheral direction. In the latter case, there would be the danger that jamming could occur under the load of the gas pressure and thus the opening movement of the fragments could be impeded.

The seal between the partition and the bursting diaphragm in contact therewith, and optionally also between the partition separately inserted in the motor or partition casing and the casing proper, with respect to the gases from the combustion chamber on the nozzle side is provided, for example, by means of elastic O rings made of "Perbunan" or "Buna S" or the like inserted in corresponding groove-like indentations.

According to a feature of the present invention, the utilization of holding devices for the bursting diaphragm connected to the partition result in a structural unit of partition and bursting diaphragm wherein the gasket element is reliably and firmly clamped between these two parts.

In accordance with another embodiment of the present invention, the sealing element with the single, central large flow aperture is in contact with the partition in the closed condition of the latter and is constructed as an axially displaceable sealing ring guided along its outer circumference. The annular disk-shaped sealing element seals off at least two flow apertures arranged in the partition which flow apertures are disposed in the outer region of the partition, preferably distributed uniformly in the peripheral direction and fashioned especially as correspondingly curved slotted holes. However, these last-mentioned flow apertures can also be fashioned as circular bores or other types of perforations, insofar as this provides a sufficiently large opening cross section for the propellant gases flowing from the chamber on the nose side into the combustion chamber on the nozzle side.

After the propellant charge has been burned in the nozzle-side combustion chamber, and after the further propellant charge, arranged for example in the nose-side chamber, has been ignited, the thus-produced gas pressure opens the partition so that the annular sealing disk is shifted axially toward the nozzle-side end of the motor until it is seated on an abutment. The axial displacement path is dimensioned to provide a flow cross section between the partition and the sealing ring seated on the abutment which is at least equal to the total area of all flow apertures of the partition, in order to avoid unnecessary additional choke losses of the flowing propellant gases.

Basically, it is possible to guide the annular-disk-shaped sealing element on its outer wall surface in such a difficultly displaceable manner, for example in the motor casing, that it cannot be shifted from its position in contact with the partition unintentionally, for example by shocks during transportation, handling, etc. of the motor. However, according to a feature of the present invention, the sealing element is arranged so that it is relatively easily displaceable axially with the sealing element being held in its closed position in contact with the partition by means of connecting elements separable at a predeterminable pressure load. For this purpose, it is possible, for example, to attach the sealing elements by means of separating screws or break-away rivets to the casing, but preferably to the partition proper. Here again, corresponding gasket elements are to be provided between the partition and the sealing element, as well as the outer casing, in order to prevent an undue penetration of gases from the nozzle-side combustion chamber into the chamber on the nose side.

These and other objects, features and advantages of the present invention will become more apparent from the following description when taken in connection with the accompanying drawings, which show, for purposes of illustration only, several embodiments in accordance with the present invention, and wherein:

FIG. 1 shows a solid rocket motor with two independent thrust stages in a longitudinal sectional view;

FIGS. 2A and 2B illustrate an embodiment of the present invention with a partition and a bursting diaphragm in a longitudinal sectional view;

FIGS. 4A and 4B illustrate another embodiment of the present invention with a partition and a sealing ring in a longitudinal sectional view.

Figure 3:
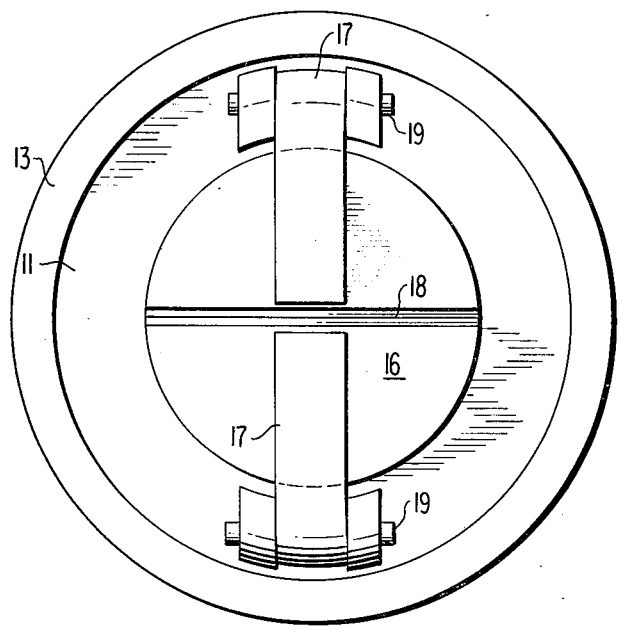
FIG. 3 is an end view of the partition and bursting diaphragm in the direction of arrow A in FIG. 2A.

Referring now to the drawings wherein like reference numerals designate like parts throughout the several views, there is shown in FIG. 1, a solid rocket motor with a casing 1 and a nozzle 2. A combustion chamber 3 is provided on the nozzle side and a combustion chamber 4 is provided on the nose side. Both combustion chambers are separated from each other by a partition 5 with a sealing element 6 provided therein. A propellant charge 7 with tamp and igniter 8 is disposed in the combustion chamber 3 on the nozzle side whereas in the nose-side combustion chamber 4, a propellant charge 9 and an igniter 10 are accommodated.

FIG. 2 shows the partition 5 with the sealing element 6 as a separate component held in the motor casing, for example, between corresponding shoulders, stops, or the like. Of course, the partition 5 can also be produced basically as an integral part of the motor casing. The top half of the figure shows the closed condition of the partition and the lower half shows the open condition of the partition. The partition 5 is here fashioned as an annular disk 11 made preferably of steel with a large central, single circular flow aperture 12 and is held within the partition housing 13 between the shoulder 14 and a separating spring ring or circlip 15. On the side of the annular disk 11 facing the combustion chamber 3 on the nozzle side, the sealing element 6 is arranged and is constructed as a bursting diaphragm 16 with a fastening or holding arrangement 17. The bursting diaphragm 16 is preferably made of aluminum, the strength of which changes comparatively little within the temperature range under consideration. A predetermined breaking line 18, fashioned as a notch, subdivides the circular-disk-shaped bursting diaphragm 16 in the manner of a diameter into two halves; each of these halves being held by means of a holder 17 on the annular disk 11 to be pivotably movable about the axles 19. Annular gaskets 20 and 21 are respectively arranged between the annular disk 11 and the bursting diaphragm 16, as well as the disk 11 and the partition housing 13, so that in the closed condition of the partition a flowing of propellant gases from the combustion chamber 3 into the combustion chamber 4 is prevented. In the open condition of the partition, the bursting diaphragm 16 and/or the halves thereof are swung away into a position completely freeing the flow aperture 12.

FIG. 3 is a view of the partition of FIG. 2 in the direction of arrow A. The bursting diaphragm 16 with the two holders 17 with pivoting axles 19, the predetermined breaking line 18, the annular disk 11, and the partition housing 13 are illustrated in end view. By controlling the position and depth of the notch 18, a defined and reproducible rupturing of the bursting diaphragm 16 is ensured.

Figure 5:
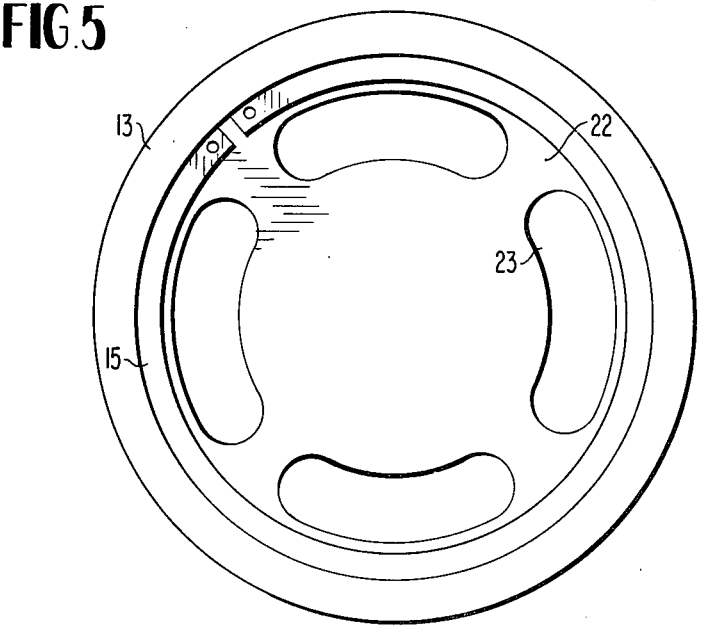
FIG. 5 is an end view of the partition and sealing ring in the direction of arrow B in FIG. 4A.

In the modification shown in FIG. 4, the partition 5 is constructed as a slotted disk 22 formed preferably of steel with — as shown in FIG. 5 — four flow apertures 23 uniformly distributed in the external region. The slotted disk 22 is held, just as the annular disk 11 in FIG. 2, in the partition housing 13 between the shoulder 14 and the spring ring 15. Alternatively, the slotted disk 22 as well as the annular disk 11 could also be threaded, for example, into the partition housing 13 or also directly into the motor casing 1. In the closed condition of the partition 5 — shown in the top half of FIG. 4 — a sealing element, namely a sealing ring 25 formed preferably of steel and having only a single, large central flow aperture 24, contacts the side of the slotted disk 22 facing the nozzle-side combustion chamber 3 and closes off the longitudinal apertures 23. The sealing ring 25 is guided in an axially displaceable manner on its outer peripheral surface 26 along the inner wall 27 of the partition housing 13 and is sealed with respect to the latter by means of the annular gasket 28. The axial displaceability is limited by a stop 29 of the partition housing 13 which in this case is constructed as a circular ring, the inside cross section of which, denoted by 30, is larger than the flow aperture 24 of the sealing ring 25.

The sealing ring 25 is provided on its inner peripheral surface with, for example, four lug-shaped radial projections 31 distributed in a uniform arrangement. Small separating screws 32, not shown, and only indicated by the central line, are provided in the zone of the projections, which screws connect the sealing ring 25 with the slotted disk 22 and thus hold same in the closed position during transportation, handling, etc. The projections 31 extending toward the inside into the flow aperture 24 are made to be maximally small so that the single, central flow aperture 24 is not unnecessarily reduced. For sealing purposes, annular gaskets 28, 33 are provided on the slotted disk and an annular gasket 34 on the sealing ring 25.

In the lower half of FIG. 4, the partition is shown in the open condition. The sealing ring 25 has been shifted toward the nozzle-side end of the motor up to engagement with the abutment 29 with the screws 32 having been torn off. FIG. 5 shows, for purposes of further explanation, a view of the slotted disk 22 with the four flow apertures 23, fashioned as curved slotted holes, the circlip 15, and the partition housing 13 taken in the direction of arrow B in FIG. 4.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A partition arrangement for rocket motors having an axis with at least two mutually independent longitudinally spaced thrust stages and nozzle and nose sides, the partition arrangement including a partition means extending substantially transversely to the axis for separating a combustion chamber on the nozzle side having a solid propellant charge therein from another chamber on the nose side, the partition means being provided with at least one flow aperture therein, and sealing means disposed on the nozzle side for sealing the at least one flow aperture of the partition means, the sealing means being displaceable for freeing the at least one flow aperture of the partition means and being maintained within the another chamber on the nozzle side upon displacement, at least one of the partition means and the sealing means being provided with only one flow aperture along the axis of the rocket motor for being completely uncovered by displacement of the sealing means and for effecting at least one of a concentration and focusing of the propellant gases from the nose side combustion chamber to enter the another chamber on the nozzle side only in a central direction whereby locally excessive thermal stresses are avoided and turbulence in the propellant gas stream is reduced.

2. A partition arrangement according to claim 1, wherein the only one flow aperture of one of the partition means and the sealing means is disposed substantially coaxially with the axis of the rocket motor.

3. A partition arrangement according to claim 1, wherein the another chamber on the nozzle side is a combustion chamber with a solid propellant charge therein.

4. A partition arrangement according to claim 1, wherein the partition means is provided with the one flow aperture therein and the sealing means is a bursting disc member contacting the partition means on the nozzle side, the bursting disc member being provided with at least one predetermined breaking line for breaking into a plurality of predetermined fragments, the plurality of fragments being displaced radially outwardly away from the one flow aperture of the partition means under the effect of the propellant gases flowing into the nozzle side chamber upon bursting of the bursting disc member so as to completely uncover the one flow aperture.

5. A partition arrangement according to claim 4, further comprising means secured to the bursting disc member and the partition means for pivoting the fragments of the bursting disc member away from the one flow aperture of the partition means and behind a portion of the partition means, the pivoting means maintaining the fragments of the bursting disc member within the nozzle side chamber.

6. A partition arrangement according to claim 5, wherein the pivoting means includes a pivot member for each fragment of the bursting disc member.

7. A partition arrangement according to claim 1, wherein the rocket motor is provided with an elongated substantially cylindrical casing at least partially delimiting the nose side and nozzle side chambers, the partition means being a disk member extending transversely to the axial direction of the motor for contacting the inner wall surface of the casing.

8. A partition arrangement according to claim 7, wherein the disk member is disposed for contacting an abutment of the casing, and further comprising securing means for maintaining the disk member in position within the casing.

9. A partition arrangement according to claim 8, wherein the disk member is provided with a gasket means at the periphery thereof for effecting a seal between the disk member and the casing.

10. A partition arrangement according to claim 7, wherein the disk member forms a part of the motor casing.

11. A partition arrangement according to claim 7, wherein the disk member is provided at the nozzle side chamber thereof with gasket means for ensuring a seal between the sealing means and the disk member.

12. A partition arrangement according to claim 11, wherein the sealing means is an annular sealing element, the annular sealing element being provided at the outer wall surface thereof with a gasket means for ensuring a seal between the sealing element and the motor casing.

13. A partition arrangement according to claim 1, wherein the sealing means in the displaced position thereof extends radially outwardly of the flow path of the one flow aperture behind a portion of the partition means.

14. A partition arrangement according to claim 1, wherein the one flow aperture is provided with a relatively large cross section.

15. A partition arrangement according to claim 5, wherein the bursting disc member is a substantially planar member extending in a plane substantially parallel to the partition means and extending across the one flow aperture only at one side of the partition means.

16. A partition arrangement according to claim 1, wherein the sealing means includes a substantially planar member extending substantially parallel to the partition means for sealingly contacting the partition means only at one side of the partition means adjacent the combustion chamber on the nozzle side.

17. A partition arrangement according to claim 1, wherein the partition means is provided with a plurality of serially disposed flow apertures arranged outwardly from the center of the partition means in the region of the periphery of the partition means, and the sealing means is an annular sealing element for contacting the nozzle side of the partition means to close the plurality of apertures therein.

18. A partition arrangement according to claim 17, wherein the annular sealing element is guided along the outer wall surface thereof for displacement in the axial direction under the effect of the propellant gases flowing into the nozzle side chamber, and further comprising stop means provided in the nozzle side chamber for limiting the movement of the annular sealing element.

19. A partition arrangement according to claim 18, further comprising connecting means for connecting the annular sealing element to the partition means to close the flow apertures therein, the connecting means being responsive to a predetermined pressure for severing the connection provided thereby and enabling the annular sealing element to be displaced.

* * * * *